US012716405B2

(12) United States Patent
Bologeorges

(10) Patent No.: US 12,716,405 B2
(45) **Date of Patent: *Aug. 25, 2026**

(54) SOLAR POWERED WATER FEATURE

(71) Applicant: Smart Living Home & Garden, Libertyville, IL (US)

(72) Inventor: James Bologeorges, Libertyville, IL (US)

(73) Assignee: Smart Living Home & Garden, Libertyville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/968,708

(22) Filed: Dec. 4, 2024

(65) Prior Publication Data

US 2025/0092865 A1 Mar. 20, 2025

Related U.S. Application Data

(63) Continuation of application No. 18/048,815, filed on Oct. 21, 2022, now Pat. No. 12,196,192.

(51) Int. Cl.
*F04B 17/00* (2006.01)
*B05B 17/08* (2006.01)
(Continued)

(52) U.S. Cl.
CPC ............ *F04B 17/006* (2013.01); *B05B 17/08* (2013.01); *F04B 49/02* (2013.01); *F04B 49/06* (2013.01); *F04D 13/068* (2013.01)

(58) Field of Classification Search
CPC .. F04B 17/006; H02J 2300/24; F04D 13/068; F04D 13/08
See application file for complete search history.

(56) References Cited

U.S. PATENT DOCUMENTS 10,166,568 B2 1/2019 Hoeks et al.
10,670,022 B2 6/2020 Roy
(Continued)

FOREIGN PATENT DOCUMENTS

CN 201361602 12/2009
CN 107528376 12/2017
(Continued)

OTHER PUBLICATIONS

K.S. Praveena, et al., "Solar power based automatic irrigation system," Research Article, International Journal of Advanced Computer Research, vol. 11(54), Apr. 28, 2021.
(Continued)

*Primary Examiner* — Kenneth J Hansen
(74) *Attorney, Agent, or Firm* — McDonnell Boehnen Hulbert & Berghoff LLP

(57) ABSTRACT

Example embodiments relate to a water feature. The water feature includes a vessel and an electrically powered submersible pump within the vessel, an outlet fluidly connected to the pump, a solar panel, and a battery. The water feature also includes a controller, a processor, and a non-transitory computer-readable medium which stores a set of program instructions which cause the water feature to perform operations. The operations include receiving a predetermined time to operate the pump on the battery. Based on the predetermined time, the operations include allocating a percent of a total electrical power generated by the solar panel to charge the battery and a remainder of the total electrical power generated to operate the pump. The operations additionally include determining that the battery has reached a threshold power level associated with the predetermined time to operate the pump and allocating the total electrical power generated to operate the pump.

20 Claims, 7 Drawing Sheets

(51) Int. Cl.

| | |
|---|---|
| ***F04B 49/02*** | (2006.01) |
| ***F04B 49/06*** | (2006.01) |
| ***F04D 13/06*** | (2006.01) |

(56) References Cited

U.S. PATENT DOCUMENTS

| | | | | |
|---|---|---|---|---|
| 10,757,874 | B2 | 9/2020 | Purcell et al. | |
| 2005/0133088 | A1 | 6/2005 | Bologeorges | |
| 2009/0313894 | A1 | 12/2009 | Bieber | |
| 2010/0303654 | A1 | 12/2010 | Petersen et al. | |
| 2012/0148427 | A1 | 6/2012 | Irving | |
| 2013/0216398 | A1 | 8/2013 | Stephens | |
| 2014/0356198 | A1 | 12/2014 | Rulli | |
| 2015/0321212 | A1 | 11/2015 | Yeiser | |
| 2017/0030360 | A1* | 2/2017 | Bryditzki .............. | F04B 17/006 |
| 2020/0341439 | A1 | 10/2020 | Valin | |
| 2023/0320294 | A1 | 10/2023 | Renaux | |

FOREIGN PATENT DOCUMENTS

| | | |
|---|---|---|
| DE | 102014203962 | 9/2015 |
| DE | 202021103587 | 7/2021 |
| EP | 2420323 | 2/2012 |
| GB | 2543092 | 4/2017 |
| IN | 00513 | 2/2015 |
| IN | 201631018219 | 2/2016 |
| IN | 201711000548 | 7/2018 |
| IN | 201841015559 | 10/2019 |
| IN | 202111041821 | 10/2021 |
| WO | WO2010066178 | 6/2010 |
| WO | WO2021094814 | 5/2021 |

OTHER PUBLICATIONS

Dr. M. Sangeetha, et al., "Solar Powered Water Management System Using Smart Card," Research Article, Turkish Journal of Computer and Mathematics Education, vol. 12 No. 9, Apr. 20, 2021.

* cited by examiner

SOLAR POWERED WATER FEATURE

CROSS-REFERENCE TO RELATED APPLICATION

This application is a continuation of U.S. patent application Ser. No. 18/048,815, filed Oct. 21, 2022. This application is incorporated herein by reference in their entirety and for all purposes.

BACKGROUND

Unless otherwise indicated herein, the materials described in this section are not prior art to the claims in this application and are not admitted to be prior art by inclusion in this section.

The use of solar cells as a source of power for garden products and ornaments is known in the art. For example, it is known to connect a solar panel to an electric pump to supply, or circulate, water to or around a garden water feature. The solar panel is selected so as to generate a sufficient amount of electrical energy to operate a given water pump.

Batteries may also be used to store power so that the given water pump can be operated when solar energy is not adequate. For example, the battery can be used at night when there is not enough solar energy for the solar panel to generate electrical energy to operate the given water pump. In some instances, energy stored by the battery might be excess electrical energy generated by the solar panel throughout the day. However, as the energy stored by the battery is only excess, the amount of electrical energy stored by the battery is not reliable. Therefore, a user cannot designate a time to operate the water pump from the battery if and when solar generation is not enough to power the pump.

SUMMARY

The present disclosure generally relates to a water feature (e.g., decorative fountain) with a solar-powered water pump with an automatic water pump shutoff sensor, the ability to simultaneously operate the water pump and charge the battery enough so that the water pump can be reliably used when the solar energy is low, and the ability to designate a period of time to operate the water pump from the battery if and when the solar generation is not enough to power the pump.

In one aspect, the present application describes a water feature. The water feature includes a vessel and an electrically powered submersible pump within the vessel to pump liquid within the vessel, an outlet fluidly connected to the electrically powered submersible pump, a solar panel to provide electrical power to the electrically powered submersible pump and a battery, where the battery provides electrical power to the electrically powered submersible pump. The water feature also includes a controller. The controller includes at least one processor and a non-transitory computer-readable medium. The non-transitory computer-readable medium stores a set of program instructions which when executed by the at least one processor causes the water feature to perform operations. The operations include receiving a predetermined time to operate the electrically powered submersible pump on the battery. Based on the predetermined time to operate the electrically powered submersible pump on the battery, the operations also include allocating a percent of a total electrical power generated by the solar panel to charge the battery and a remainder of the total electrical power generated to operate the electrically powered submersible pump. The operations additionally include determining that the battery has reached a threshold power level associated with the predetermined time to operate the electrically powered submersible pump. The operations further include allocating the total electrical power generated to operate the electrically powered submersible pump.

In another aspect, the present application describes a method of simultaneously charging a battery and operating a pump with the ability to designate a period of time to operate the pump from the battery if and when the solar generation is not enough to power the pump. The method includes receiving a predetermined time to operate an electrically powered submersible pump on a battery. Based on the predetermined time to operate the electrically powered submersible pump on the battery, the method also includes allocating a percent of a total electrical power generated by a solar panel to charge the battery and a remainder of the total electrical power generated to operate the electrically powered submersible pump. The method additionally includes determining that the battery has reached a threshold power level associated with the predetermined time to operate the electrically powered submersible pump. The method further includes allocating the total electrical power generated to operate the electrically powered submersible pump.

In yet another aspect, the present application describes a non-transitory computer-readable storage medium having stored thereon instructions that, when executed by a computing device, cause the computing device to perform operations. The operations include receiving a predetermined time to operate the electrically powered submersible pump on a battery. Based on the predetermined time to operate the electrically powered submersible pump on the battery, the operations also include allocating a percent of a total electrical power generated by a solar panel to charge the battery and a remainder of the total electrical power generated to operate the electrically powered submersible pump. The operations additionally include determining that the battery has reached a threshold power level associated with the predetermined time to operate the electrically powered submersible pump. The operations further include allocating the total electrical power generated to operate the electrically powered submersible pump.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
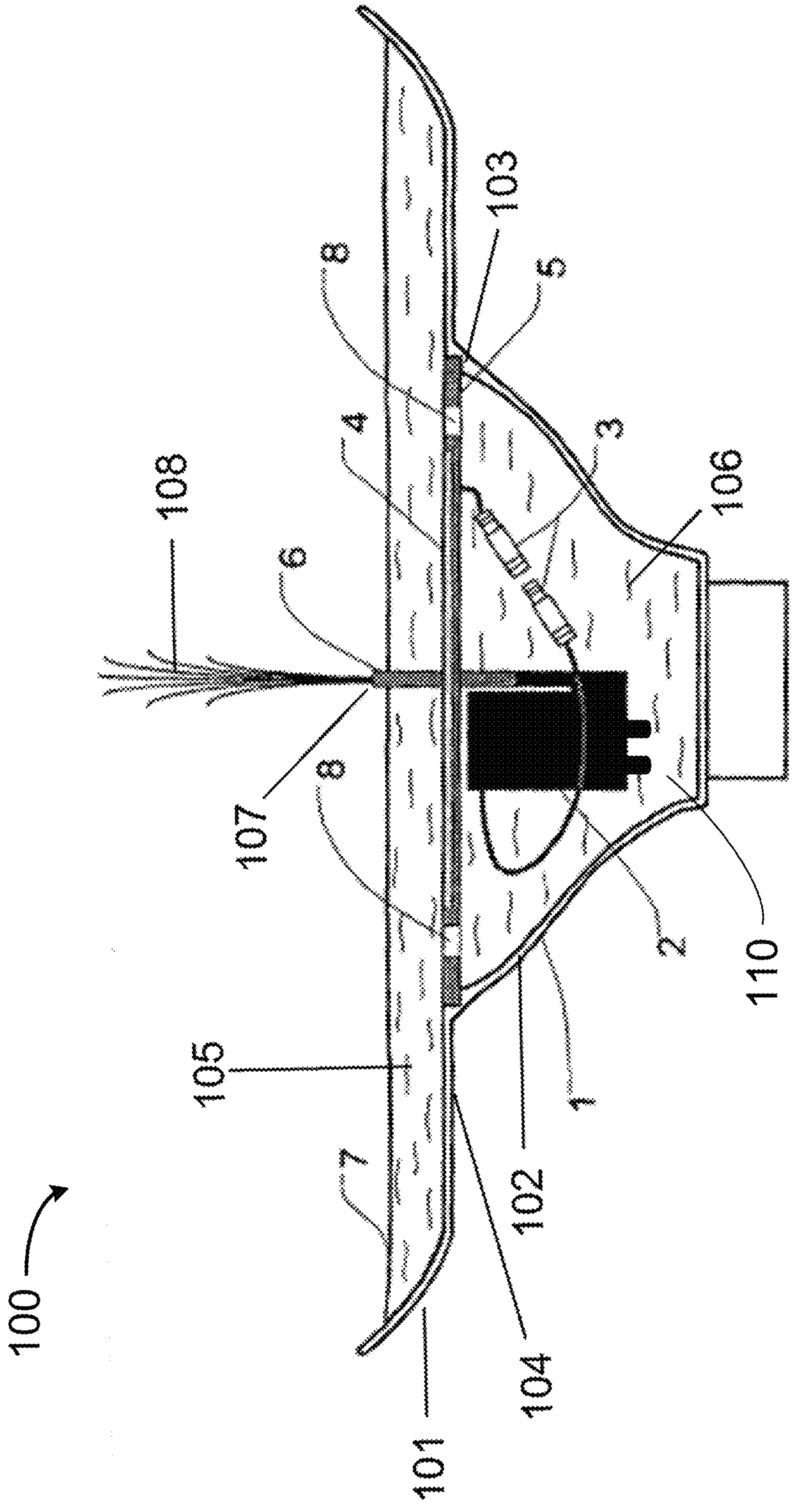
FIG. 1A illustrates water feature, according to an example embodiment.

Example methods, devices, and systems are described herein. It should be understood that the words “example” and “exemplary” are used herein to mean “serving as an example, instance, or illustration.” Any embodiment or feature described herein as being an “example” or “exemplary” is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term “about” or “substantially” with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Outdoor water features, such as bird baths and fountains, may be powered using solar generated energy. However, such water features may not operate at night. Currently, one technique may be to add a battery to the water feature. The battery may store any excess power generated by a solar panel that is not needed to operate the water feature. As this technique only stores the excess power generated, there may be instances where there was no excess power. Thus, the battery may not contain enough power to operate an electrically powered submersible pump at night or when the solar intensity is below a threshold. Additionally and/or alternatively, there may be scenarios in which the pump continues to operate even when there is no water in the water feature. This could result in burning out the pump.

In some embodiments, the present disclosure can include a water feature that can simultaneously charge its battery and operate its pump from power generated by its solar panel. For example, from the power that the solar panel generates, a predetermined portion can go towards operating the pump, and a predetermined portion can go toward charging the battery. In an example embodiment, 75% of the power generated can go towards operating the pump while 25% of the power generated can go towards charging the battery. This may allow enough power to be stored in the battery so that the water feature can be reliably operated when the sun is not out. To reliably operate the solar feature may mean that in at least 75% of the times a user wishes to operate the water feature when solar power is not enough, the water feature will operate. For example, the user can designate that they would like the water feature to continue operation after sunset, and the water feature does.

Further, a remote control can be used to designate for how long the pump should be run and if and when the pump should be shutoff. For example, the pump could be operated for two hours and then shut off for all of the power generated by the solar panel to go to the battery. Alternatively, the pump could be run until, around dusk, there is not enough sun for the solar panel to generate enough power to run the pump. The pump can therefore be shutoff and the battery can be charged with the last remaining rays of sun.

In an example embodiment, the water feature can also include an automatic pump shutoff sensor. The automatic pump shut off sensor can include a plurality of moisture sensing electrodes disposed on the pump approximately 15 to 20 millimeters off of the bottom of the vessel that holds the water in the water feature. When the electrodes sense a moisture level that is below a predetermined threshold, the circuit that runs the pump may be opened to shutoff the pump. This prevents the pump from draining the battery when there is no water in the vessel, let alone from burning out the pump.

FIG. 1A illustrates a solar powered water feature 100 in the form of a bird bath, viewed in section, according to an example embodiment. The water feature body 1 may also be referred to herein as the water feature vessel. In at least some embodiments, the water feature body 1 may be mounted on a pedestal. The body 1, has an upper portion in the form of a flat dish 101 and a lower portion in the form of a collecting basin 102 arranged below it, and is filled with water. A flat insert 5 which is circular in shape when viewed from above is positioned in the water feature body 1 and supported on a peripheral ridge 103. The insert 5 covers the collecting basin 102 and forms part of the base 104 of the flat dish 101. On the top of the insert 5 is provided a solar panel 4, the insert 5 and solar panel 4 constituting a solar panel assembly. The insert 5 carrying the solar panel 4, thus defines a volume of water 105 above the insert 5, in the collecting dish 101, and a volume of water 106 below the insert, in the collecting basin 102. The depth of the water 105 above the insert 5 is limited to a level which allows birds to stand in the water. The solar panel 4 located under the surface 7 of the water 105 provides the electrical power needed to operate an electrically powered submersible pump 2 and a battery through solar radiation. The battery may be positioned within the housing for the solar panel 4. Alternatively, the battery can be outside of the housing for the solar panel 4 and could be removable. The battery provides electrical power to the electrically powered submersible pump 2 when the solar radiation is not enough to power the pump 2. The battery is electrically connected to the solar panel 4 and to pump 2. As the battery is located within the housing for the solar panel 4, it is not shown in FIG. 1A.

In an example embodiment, the vessel 1 may hold a liquid, such as water, for the bird bath. The water can define a surface 7 in the vessel 1. The solar panel 4 can be disposed below the surface 7 of the water. For example, the solar panel 4 can be disposed anywhere from 1 mm to 50 mm below the surface 7 of the water. Alternatively, the solar panel 4 could be level with the surface 7 of the liquid.

The pump 2 is mounted to the lower side of the insert 5 and secured thereto and is thus disposed in the volume of water 106 in the collecting basin 102 of the water feature body 1. In an example embodiment, the pump 2 can include a DC motor. The solar panel 4 and pump 2 are electrically connected by a connecting plug 3 which can be pulled apart. The pump 2 can also be fluidly connected to a water outlet 107. For example, the water delivered by the pump 2 passes through a riser pipe 6 having the water outlet 107 above the surface of the water 7 from which water issues in the form of a fountain 108. The riser pipe 6 passes through a hole in the housing 5 and solar cell 4.

Additionally, in an attempt to ensure that the pump 2 does not continue to run when there is no water in the collecting basin 102, the pump 2 may include a plurality of moisture sensors 110. The moisture sensors 110 could include a plurality of electrodes positioned on the pump 2 to detect whether the water level in the collecting basin 102 reaches a water intake on pump 2. In operation, if the water level reaches the electrodes, the water acts as a resistive element between the electrodes and completes a circuit in the pump 2, however when the water level does not reach the electrodes, the circuit opens and the pump 2 will shut off. The moisture sensors may be positioned on the pump 2, adjacent to a bottom of the body 1. For example, the moisture sensors may be positioned anywhere from 1 mm to 50 mm above the bottom of the vessel. The intake for the pump 2 may be the same distance above the bottom of the vessel as the sensors. Alternatively, the intake for the pump 2 could be closer to the bottom of the vessel than the sensors.

The water can flow through apertures 8 in the insert 5 which provide a return path from the upper portion into the lower portion of the water feature body 1, thus ensuring a constant supply of water to the pump 2.

The solar cell 24 is a prefabricated unit and has waterproof glass on the top and at the sides. In an alternative embodiment, the top of the solar cell can be made from other suitable materials, including but not limited to silicon, or plastic. On the underside is provided a film which is sealed off at the edges by laser treatment. A corresponding laser seal may be provided for the passage of the riser pipe 26.

Figure 1B:
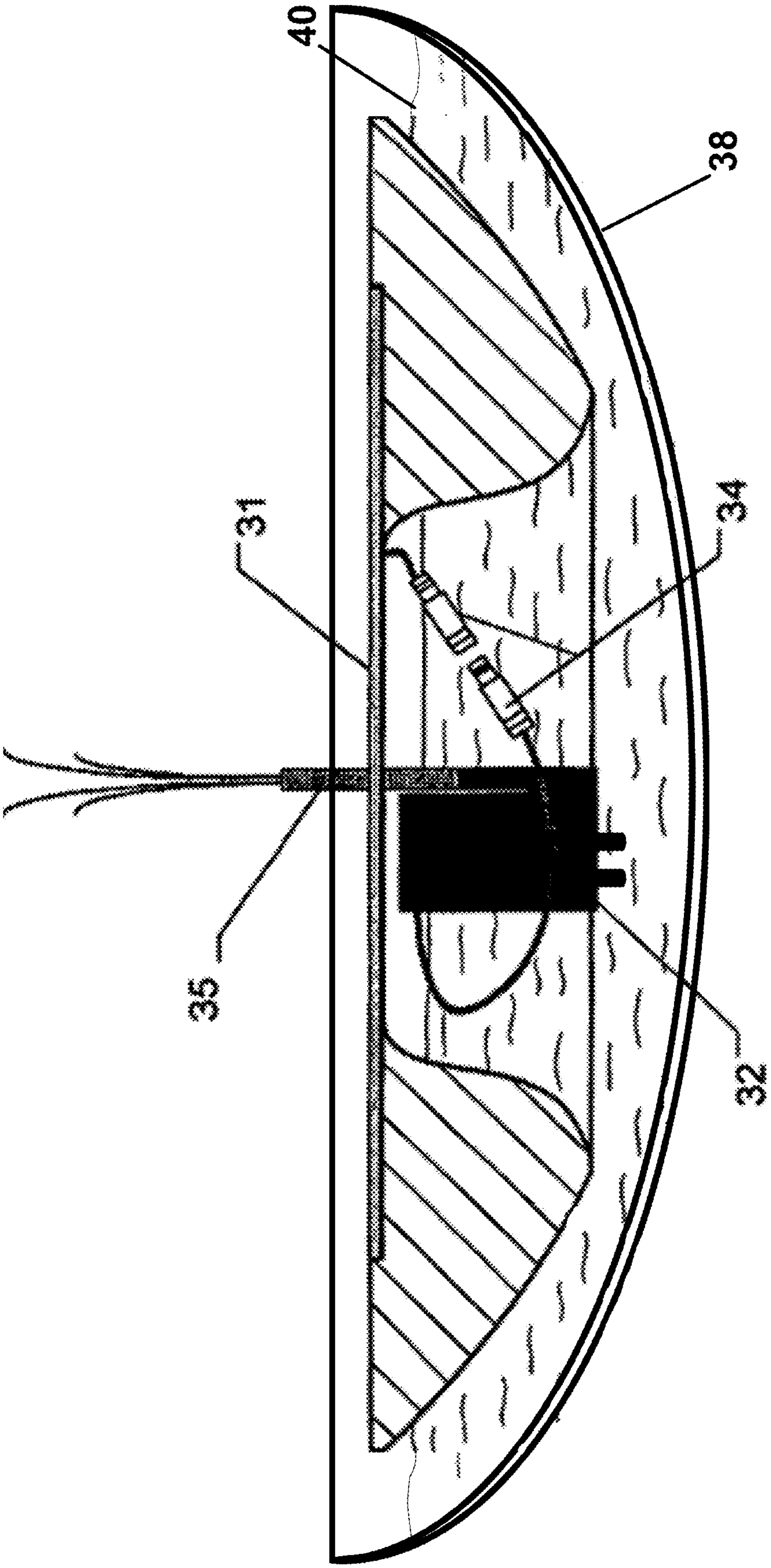
FIG. 1B illustrates water feature, according to an example embodiment.

FIG. 1B shows a water feature with solar panel 31 and pump 32 viewed in cross-section, according to an example embodiment. The water feature in 1B may illustrate a floating embodiment. The solar panel 31 receives solar radiation and supplies the energy required to operate a pump 32 and a battery. As the battery is located within the housing for the solar panel 31, it is not shown in FIG. 1B. Alternatively, the battery can be outside of the housing for the solar panel 31 and could be removable. The battery provides electrical power to the pump 32 when the solar radiation is not enough to power the pump 32. The water feature may include a vessel 38 that can hold liquid for the bird bath. Alternatively, the liquid may be contained in a body of water that is not constrained by a vessel. The liquid can define a surface 40 in the vessel 38. The solar panel 31 can be disposed above the surface 38 of the liquid. Alternatively, the solar panel could be level with the surface of the liquid. The solar panel 31 and pump 32 are electrically connected by a separable connecting plug 34. The battery is electrically connected to the solar panel 4 and to pump 32 and is located within the pump 32 housing. The water conveyed by the pump 32 emerges through a riser pipe 35 above the surface of the water in the form of a fountain.

Figure 1C:
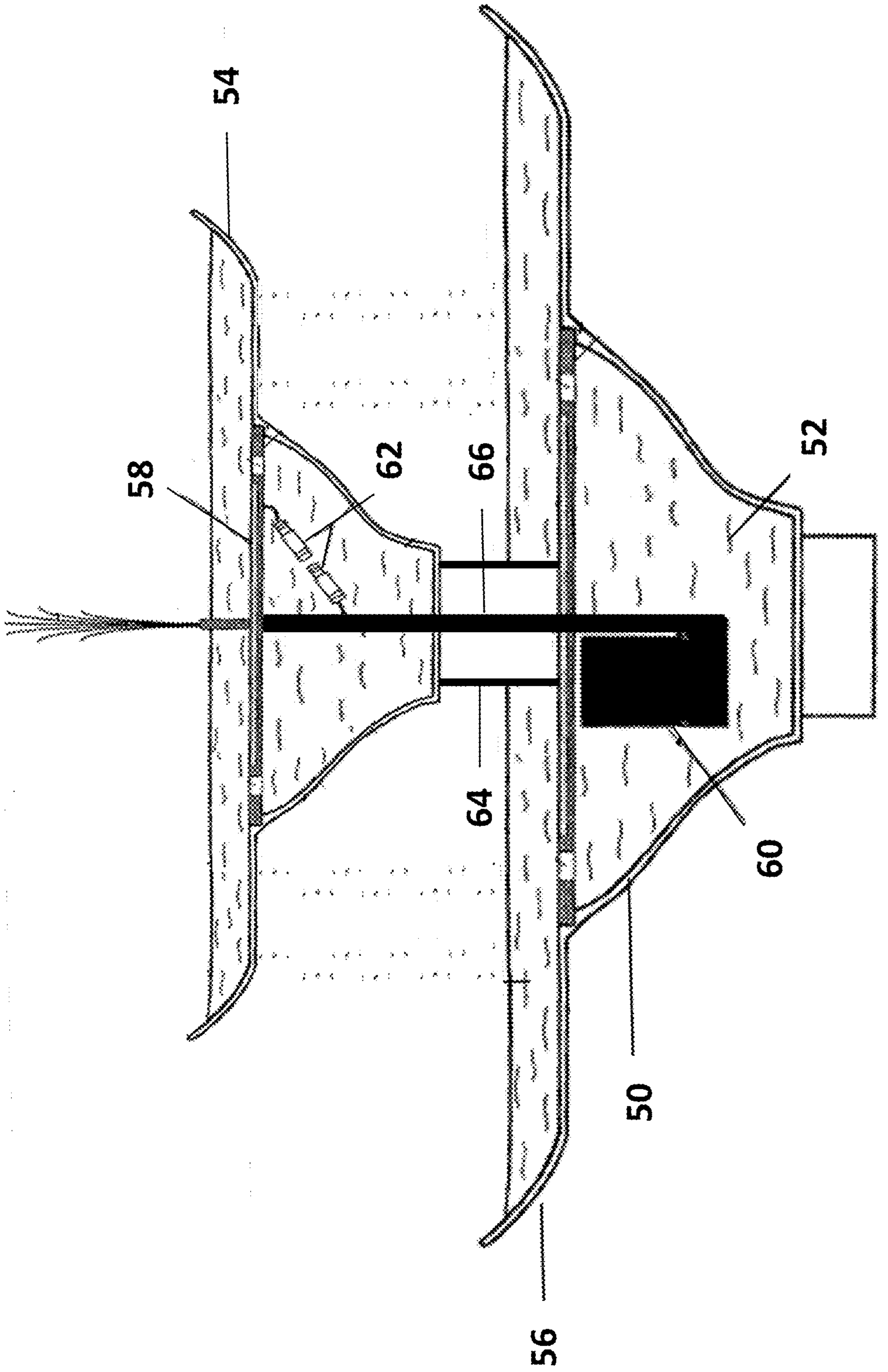
FIG. 1C illustrates water feature, according to an example embodiment.

FIG. 1C shows a water feature with solar panel 31 and pump 32 viewed in cross-section, according to an example embodiment. The water feature in 1C may illustrate a tiered embodiment. The water feature may include a vessel 50 that can hold liquid 52 for the bird bath. The vessel 50 may include a top tier 54 and a bottom tier 56. In an example embodiment, the solar panel 58 may be in the top tier 54 of the water feature. The solar panel 58 receives solar radiation and supplies the energy required to operate a pump 60 and a battery. As the battery is located within the housing for the solar panel 58, it is not shown in FIG. 1C. Alternatively, the battery can be outside of the housing for the solar panel 58 and could be removable. The battery provides electrical power to the pump 60 when the solar radiation is not enough to power the pump 60. As illustrated in FIG. 1C, the pump 60 can be in the bottom tier 56 of the water feature. The solar panel 58 and pump 60 are electrically connected by a separable connecting plug 62. In an example embodiment, the connecting plug 62 may extend through a trunk 64 of the water feature. The battery is electrically connected to the solar panel 58 and to pump 60. The water 52 conveyed by the pump 60 up a riser pipe 35 and emerges through the riser pipe 66 above the surface of the water in the form of a fountain. The water may then spill over the sides of the top tier back into the bottom tier.

Figure 1D:
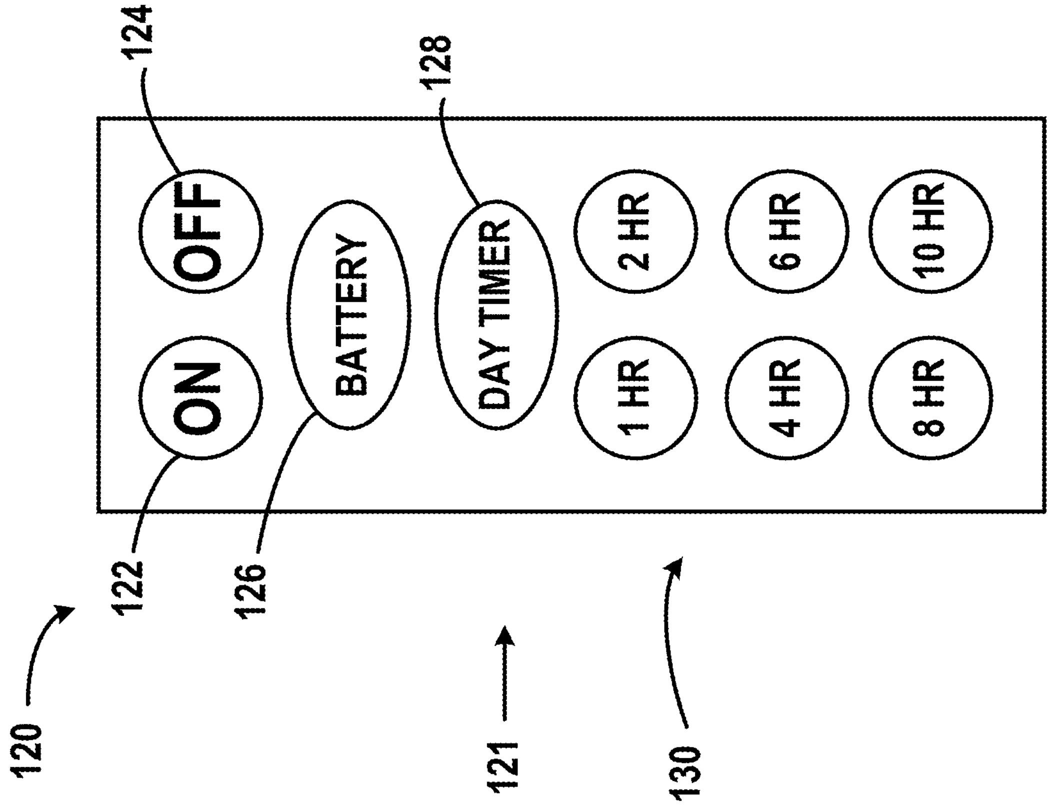
FIG. 1D illustrates a remote device for a water feature, according to an example embodiment.

An example embodiment of the water feature can further include a remote device. FIG. 1D illustrates a remote device 120 for operating the water feature 100, according to an example embodiment. The remote device 120 can include a user interface 121 to assist in operating the remote feature. For example, the remote device 120 can include an "on" button 122 to turn the pump 2 on and an "off" button 124 to turn the pump 2 off for water feature 100. The remote device 120 can further be used to select a predetermined time for the pump to operate off of the battery. The remote device 120 can include a battery button 126 to select that the pump should run on the battery after sunset. The remote device 120 can further include a timer button 128 to select how long the pump should run during the day. A plurality of timer buttons 130 can be used to select an amount of time to operate the pump during the day or after sunset. In an alternative embodiment, the remote device could include a graphical user interface, could be part of a phone application, or could be a digital remote. In these embodiments, the user could select a "timer" button. Based on hitting the timer button the remote device could cycle through an amount of time to run the pump. For example, selecting the timer button once would communicate that the pump should run for one hour, selecting the timer button twice would communicate that the pump should run for two hours, so on and so forth up to eight hours. After eight hours the remote may cycle back to one.

Alternatively, the user interface to operate the water feature could be disposed on the water feature. For example, the user interface could be positioned on the outside of the vessel. The user interface could include an "on" button, an "off" button, a battery button, a timer button, and a plurality of times to operate the pump. Alternatively still, the water feature could operate automatically without the need for any user interface.

Figure 2:
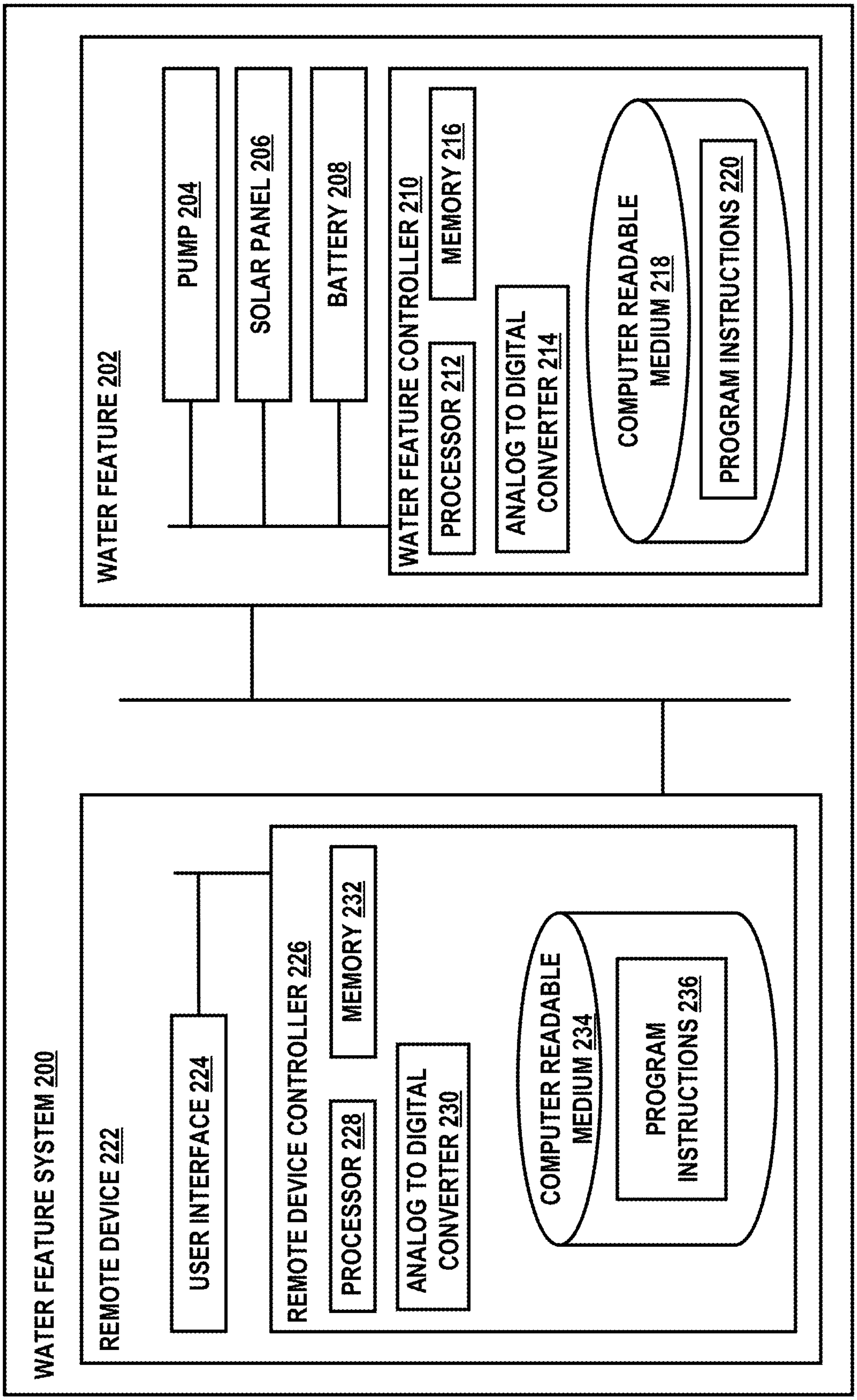
FIG. 2 illustrates a block diagram of the water feature, according to an example embodiment.

FIG. 2 illustrates a block diagram of a water feature system 200. The water feature system 200 can include the water feature 202 and the remote device 222. As previously discussed, the remote device 222 can be used to operate the water feature 202. As illustrated in FIG. 2, the water feature 202 can include a pump 204, a solar panel 206, and a battery 208. The pump 204, the solar panel 206, and the battery 206 can be in communication with a water feature controller 210. The water feature controller 210 includes at least one water feature processor(s) 212, at least one water feature analog to digital converter 214, and a water feature memory 216. The memory 216 may include a water feature computer readable medium 218, such as a non-transitory computer readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc. Other types of storage devices, memories, and media are also contemplated herein.

The computer-readable medium 218 may also store a set of water feature program instructions 220 executable by the processor(s) 212 to perform operations. The at least one processor(s) 212 can include one or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are also contemplated herein.

As illustrated in FIG. 2, the water feature system 200 includes the remote device 222. The remote device 222 can receive user input for operating the water feature 202. The user input can then be received by the water feature 202. The remote device 222 can include a user interface 224 in communication with the remote device controller 226. The remote device controller 226 includes at least one remote device processor(s) 228, at least one remote device analog to digital converter 230, and a remote device memory 232. The memory 232 may include a remote device computer readable medium 234, such as a non-transitory computer readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc. Other types of storage devices, memories, and media are also contemplated herein.

The computer-readable medium 234 may also store a set of remote device program instructions 236 executable by the processor(s) 228 to perform operations. The at least one processor(s) 228 can include one or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are also contemplated herein.

Figure 3:
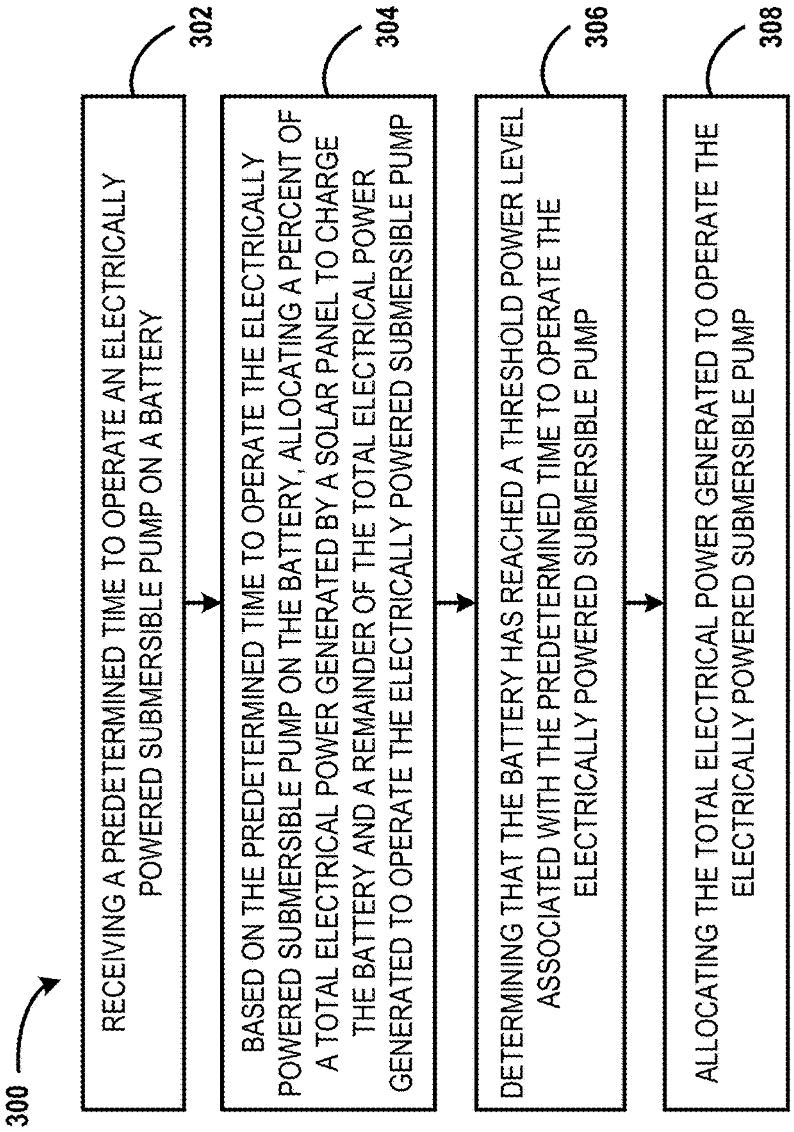
FIG. 3 illustrates a flow chart of a method, according to an example embodiment.

FIG. 3 illustrates a block diagram of operations according to an example embodiment. In particular, FIG. 3 depicts operations 300 for use in operating the water feature. Operations 300 may be carried out by the remote device and the water feature, particularly by water feature system 200. For example, aspects of the functions of operations 300 may be performed by remote device controller 226 and/or water feature controller 210. The operations can include receiving a predetermined time to operate the electrically powered submersible pump on the battery, based on the predetermined time to operate the electrically powered submersible pump on the battery, allocating a percent of a total electrical power generated by the solar panel to charge the battery and a remainder of the total electrical power generated to operate the electrically powered submersible pump, determining that the battery has reached a threshold power level associated with the predetermined time to operate the electrically powered submersible pump, and allocating the total electrical power generated to operate the electrically powered submersible pump.

At block 302, operations 300 may include receiving a predetermined time to operate the electrically powered submersible pump on the battery. In an example embodiment, the predetermined time is received via the remote device as previously described. For example, the remote device could include buttons to select that the pump should run on battery when the solar energy is not enough, that the pump should run on a timer during the day, and how long the pump should be run for. Alternatively, the predetermined time could be received from a user interface located on the water feature.

In an example embodiment the predetermined time to operate the pump on the battery could be a time associated with a solar power level that is below a threshold solar power level. During the time below the threshold solar power level, power is provided to the pump from the battery. The threshold solar power level could be the amount of solar power needed to power the pump using the solar panel, and any time of day associated with a solar power level below the threshold could be the predetermined time. For example, the time could be after sunset when the solar power is no longer strong enough to power the pump.

The predetermined time could also be a time period. The time period could be a length of time that the pump should operate from the battery. For example, the operations could include receiving an instruction for the pump to operate off of the battery for one hour after the solar power level is below the threshold solar power level. Alternatively, the pump could continuously operate off of the battery until the battery has reached a baseline battery power capacity cut off. For example, 15% of the total battery power capacity left. Other values are also possible. In an example embodiment, the pump will not drain the battery to below the baseline battery power capacity cut off power capacity.

Additionally, the operations could include receiving a predetermined time to operate the pump from solar power could include time for operating on the solar panel. This could be receiving an amount of time that the pump should operate during the day when the solar power level is above the threshold level.

At block 304, operations 300 may include based on the predetermined time to operate the electrically powered submersible pump on the battery, allocating a percent of a total electrical power generated by the solar panel to charge the battery and a remainder of the total electrical power generated to operate the electrically powered submersible pump. In an example embodiment, during a sunny day the solar panel could generate enough electrical power to use 75% of the power to operate the pump and 25% of the power to charge the battery in order to operate the pump when the solar power level is below the threshold. Other allocation percentages are also possible. For example, 85% of the power generated by the solar panel could go towards operating the pump, while 15% could go toward charging the battery.

In an example embodiment allocating the power to the battery and the pump can include determining how much power the battery needs based on how long the pump needs to run off of the battery. The operations can first include determining an amount of power associated with the predetermined time period of operating the electrically powered submersible pump on the battery. The operations could further include determining a first temporal period to allocate the percent of a total electrical power generated by the solar panel to charge the battery and the remainder of the total electrical power generated to operate the electrically powered submersible pump. For example, to run the pump from the battery for one hour, the battery may need to be charged to 25% its capacity. In order to charge the battery to 25%, the solar panel may only need to allocate power to the battery for a few hours. The operations can then include determining a second temporal period to allocate the total electrical power generated to the pump. The second temporal period could be any time following the first temporal period when power is allocated to charge the battery. During the second temporal period, all of the electrical power generated by the solar panel could go towards operating the pump.

Alternatively, the pump could be switched off and all of the electrical power generated by the solar panel could be allocated towards charging the battery. In this embodiment, the remote device could be used to select the "off" button. In "off" all of the power generated can go to the battery. Therefore, the battery may be fully charged in order to operate the fountain at night.

At block 306, operations 300 may include determining that the battery has reached a threshold power level associated with the predetermined time to operate the electrically powered submersible pump. The threshold power level might be when the battery is fully charged so that the pump can be operated at night. Alternatively, the threshold power level could be the amount of power needed to be stored in the battery in order for the pump to be operated off of the battery for the predetermined time. Referring to a previous example, to run the pump from the battery for one hour, the battery may need to be charged to 25% its capacity. Once the battery is charged to 25% of its capacity the threshold power level is met.

At block 308, operations 300 may include allocating the total electrical power generated to operate the electrically powered submersible pump. Once the battery is charged to the threshold power level, all of the electrical power that is generated by the solar panel may be allocated towards operating the pump. This could occur after the battery is fully charged, or after the battery is partially charged. Alternatively, all electrical power generated could go towards operating the pump and none could go toward charging the battery.

A further example embodiment could include detecting, with the moisture sensors, a moisture level that is below a predetermined threshold. As previously discussed, the moisture sensors may be positioned on the bottom of the pump and can be used to detect when the water level in the vessel is too low to operate the pump. When the water level does not reach the moisture sensors, the moisture level is below the predetermined threshold. Then, the pump will turn off. This safeguard may assist in preventing the pump from continuously running when there is no water in thus vessel. Therefore, power is not wasted, and the pump does not burn out.

Figure 4:
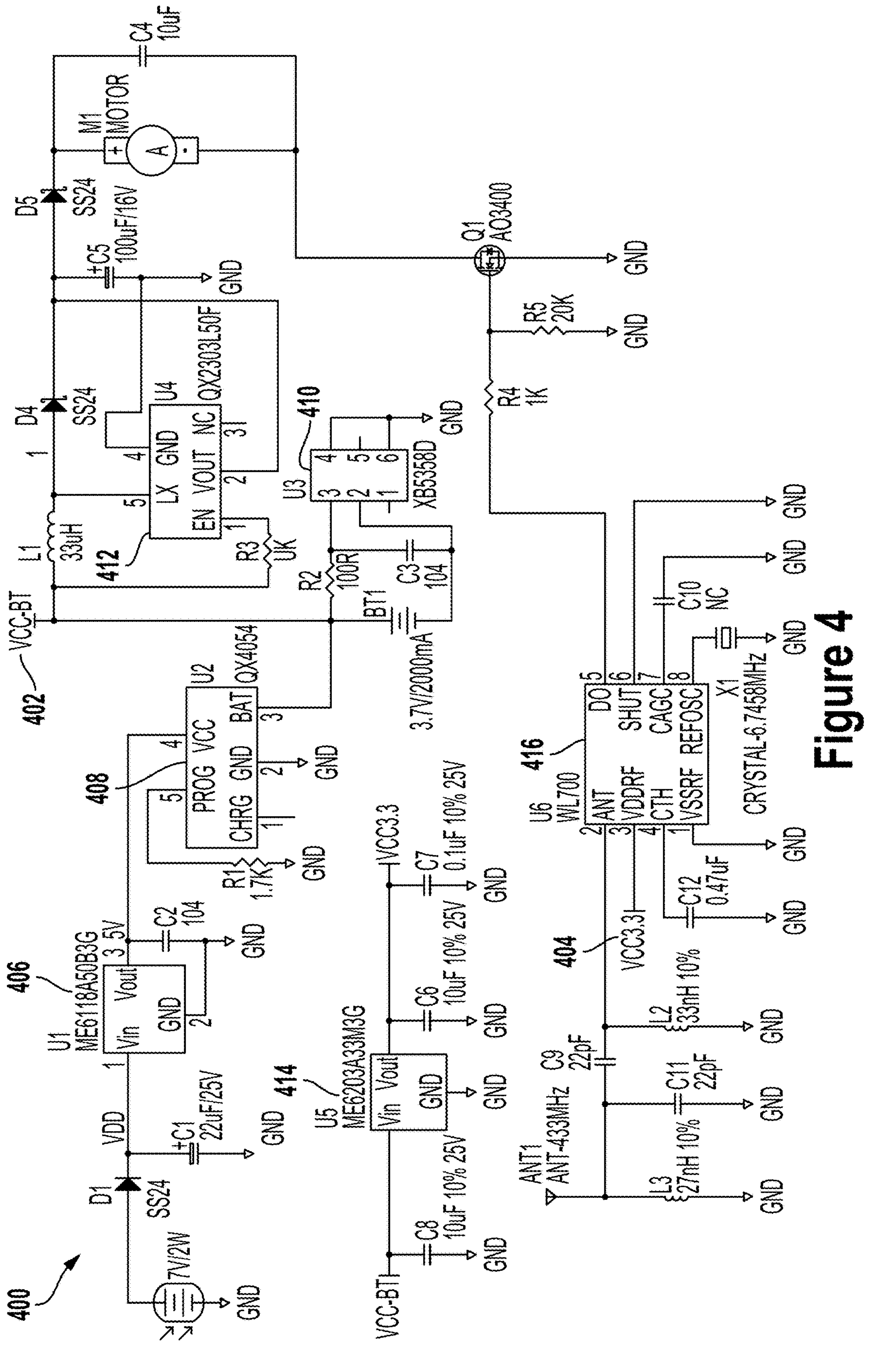
FIG. 4 illustrates a circuit diagram corresponding to a motor controller, according to an example embodiment.

FIG. 4 is a schematic illustrating the control circuit 400 according to an embodiment of the invention. The figure identifies specific components that are suitable for use in this embodiment. Particularly for the water feature.

For example, the circuit includes a first conductive prong 402 and a second conductive prong 404 which are moisture sensors. There may be an electrical potential between the prongs. In operation, when water is covering the two moisture sensors the water lowers the resistance in the circuit and allows the circuit to be closed therefore allowing the pump to operate.

In an example embodiment, the circuit can include voltage regulator 406, a single-cell lithium-ion battery constant current and constant voltage linear charging integrated circuit 408, a lithium-ion battery protection integrated circuit 410, a step-up DC-DC converter 412, a low-dropout linear voltage regulators with a built-in voltage reference module, error correction module and phase compensation module 414, and a wireless receiver circuit 416.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A water feature comprising:

an electrically powered submersible pump, configured to pump liquid;

a solar panel configured to provide electrical power to the electrically powered submersible pump and a battery, wherein the battery is configured to provide electrical power to the electrically powered submersible pump; and a controller, wherein the controller comprises at least one processor and a non-transitory computer-readable medium, wherein the non-transitory computer-readable medium stores a set of program instructions which when executed by the at least one processor causes the water feature to perform operations comprising:

receiving a predetermined time to operate the electrically powered submersible pump on the battery;

determining an amount of power associated with the predetermined time of operating the electrically powered submersible pump on the battery; and based on the predetermined time to operate the electrically powered submersible pump on the battery and the amount of power associated with the predetermined time of operating the electrically powered submersible pump on the battery, allocating a percent of a total electrical power generated by the solar panel to charge the battery and a remainder of the total electrical power generated to operate the electrically powered submersible pump.

2. The water feature of claim 1, wherein the electrically powered submersible pump comprises a plurality of moisture sensors.

3. The water feature of claim 2, wherein the operations further comprise:

detecting, with the moisture sensors, a moisture level that is below a predetermined threshold; and turning off the electrically powered submersible pump.

4. The water feature of claim 1, wherein the predetermined time to operate the electrically powered submersible pump on the battery comprises a time associated with a solar power level, and wherein the solar power level is below a threshold solar power level.

5. The water feature of claim 1, wherein the predetermined time comprises a predetermined time period.

6. The water feature of claim 5, wherein allocating the percent of the total electrical power generated by the solar panel to charge the battery and the remainder of the total electrical power generated to operate the electrically powered submersible pump further comprises:

determining a first temporal period to allocate the percent of the total electrical power generated by the solar panel to charge the battery and the remainder of the total electrical power generated to operate the electrically powered submersible pump; and determining a second temporal period to allocate the total electrical power generated to the battery.

7. The water feature of claim 1, wherein the operations further comprise providing power to the electrically powered submersible pump from the battery during the predetermined time.

8. The water feature of claim 1, wherein receiving the predetermined time is via a remote device.

9. The water feature of claim 1, further comprising a user interface, and wherein receiving the predetermined time is via the user interface.

10. The water feature of claim 1, wherein the operations further comprise:

determining that the battery has reached a threshold power level associated with the predetermined time to operate the electrically powered submersible pump; and allocating the total electrical power generated to operate the electrically powered submersible pump.

11. A method comprising:

receiving a predetermined time to operate an electrically powered submersible pump on a battery;

determining an amount of power associated with the predetermined time of operating the electrically powered submersible pump on the battery; and based on the predetermined time to operate the electrically powered submersible pump on the battery and the amount of power associated with the predetermined time of operating the electrically powered submersible pump on the battery, allocating a percent of a total electrical power generated by a solar panel to charge the battery and a remainder of the total electrical power generated to operate the electrically powered submersible pump.

12. The method of claim 11, further comprising:

detecting, with a plurality of moisture sensors coupled to the electrically powered submersible pump, a moisture level that is below a predetermined threshold; and turning off the electrically powered submersible pump.

13. The method of claim 11, wherein the predetermined time to operate the electrically powered submersible pump on the battery comprises a time associated with a solar power level, and wherein the solar power level is below a threshold solar power level.

14. The method of claim 11, wherein the predetermined time comprises a predetermined time period.

15. The method of claim 14, wherein allocating the percent of the total electrical power generated by the solar panel to charge the battery and the remainder of the total electrical power generated to operate the electrically powered submersible pump comprises:

determining a first temporal period to allocate the percent of the total electrical power generated by the solar panel to charge the battery and the remainder of the total electrical power generated to operate the electrically powered submersible pump; and determining a second temporal period to allocate the total electrical power generated to the battery.

16. The method of claim 11, further comprising:

providing power to the electrically powered submersible pump from the battery during the predetermined time.

17. The method of claim 11, further comprising:

determining that the battery has reached a threshold power level associated with the predetermined time to operate the electrically powered submersible pump; and allocating the total electrical power generated to operate the electrically powered submersible pump.

18. A non-transitory computer-readable storage medium having stored thereon instructions that, when executed by a computing device, cause the computing device to perform operations comprising:

receiving a predetermined time to operate an electrically powered submersible pump on a battery;

determining an amount of power associated with the predetermined time of operating the electrically powered submersible pump on the battery; and based on the predetermined time to operate the electrically powered submersible pump on the battery and the amount of power associated with the predetermined time of operating the electrically powered submersible pump on the battery, allocating a percent of a total electrical power generated by a solar panel to charge the battery and a remainder of the total electrical power generated to operate the electrically powered submersible pump.

19. The non-transitory computer-readable storage medium of claim 18, further comprising:

detecting, with a plurality of moisture sensors coupled to the electrically powered submersible pump, a moisture level that is below a predetermined threshold; and turning off the electrically powered submersible pump.

20. The non-transitory computer-readable storage medium of claim 18, wherein the predetermined time to operate the electrically powered submersible pump on the battery comprises a time associated with a solar power level, and wherein the solar power level is below a threshold solar power level.

* * * * *